United States Patent
Canard et al.

(10) Patent No.: US 10,812,506 B2
(45) Date of Patent: Oct. 20, 2020

(54) METHOD OF ENCIPHERED TRAFFIC INSPECTION WITH TRAPDOORS PROVIDED

(71) Applicant: Orange, Paris (FR)

(72) Inventors: Sebastien Canard, Chatillon (FR); Aida Diop, Chatillon (FR); Nizar Kheir, Chatillon (FR); Marie Paindavoine, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/337,724

(22) PCT Filed: Sep. 29, 2017

(86) PCT No.: PCT/FR2017/052689
§ 371 (c)(1),
(2) Date: Mar. 28, 2019

(87) PCT Pub. No.: WO2018/060657
PCT Pub. Date: Apr. 5, 2018

(65) Prior Publication Data
US 2020/0036735 A1 Jan. 30, 2020

(30) Foreign Application Priority Data
Sep. 30, 2016 (FR) .................. 16 59428

(51) Int. Cl.
*H04L 29/06* (2006.01)
*H04L 9/08* (2006.01)
*H04L 9/14* (2006.01)

(52) U.S. Cl.
CPC ........ *H04L 63/1416* (2013.01); *H04L 9/0861* (2013.01); *H04L 9/14* (2013.01); *H04L 63/0442* (2013.01); *H04L 63/20* (2013.01)

(58) Field of Classification Search
CPC ..... H04L 63/1416; H04L 9/0861; H04L 9/14; H04L 63/0442; H04L 63/20
(Continued)

(56) References Cited

U.S. PATENT DOCUMENTS

| 2009/0300351 A1* | 12/2009 | Lei | ............... H04L 9/0894 713/165 |
| 2012/0297201 A1* | 11/2012 | Matsuda | ........... G06F 21/6245 713/189 |
| 2015/0371062 A1* | 12/2015 | Ito | .............. G06F 21/62 713/164 |

OTHER PUBLICATIONS

International Preliminary Report on Patentability and English translation of the Written Opinion of the International Searching Authority dated Apr. 2, 2019 for International Application No. PCT/FR2017/052689, filed Sep. 29, 2017.

(Continued)

*Primary Examiner* — Kambiz Zand
*Assistant Examiner* — Benjamin A Kaplan
(74) *Attorney, Agent, or Firm* — David D. Brush; Westman, Champlin & Koehler, P.A.

(57) ABSTRACT

A method for detecting intrusions uses a searchable enciphering algorithm and includes: generating a trap bypass key for a security device, which is able to determine keywords characteristic of intrusions, generating by the security device a trap for each keyword by using the trap bypass key; providing the traps to an intrusions detection device; intercepting by the detection device character strings sent on the network by a sender and enciphered with a public key of a receiver; applying by the detection device a test procedure on the character strings enciphered using the traps; and detecting an intrusion on the network if there exists according to the test procedure an enciphered character string representative of a cipher of a keyword.

13 Claims, 2 Drawing Sheets

(58) Field of Classification Search
USPC .......................................................... 713/153
See application file for complete search history.

(56) References Cited

OTHER PUBLICATIONS

International Search Report dated Dec. 11, 2017 for International Application No. PCT/FR2017/052689, filed Sep. 29, 2017.
Written Opinion of the International Searching Authority dated Dec. 11, 2017 for International Application No. PCT/FR2017/052689, filed Sep. 29, 2017.
Justine Sherry et al: "Blindbox: Deep Packet Inspection over Encrypted Traffic", Apr. 22, 2022.
Thomas Fuhr et al: "Decryptable Searchable Encryption".
Lucas Ibraimi et al: "Public'Key Encryption with Delegated Search".

* cited by examiner

METHOD OF ENCIPHERED TRAFFIC INSPECTION WITH TRAPDOORS PROVIDED

CROSS-REFERENCE TO RELATED APPLICATIONS

This Application is a Section 371 National Stage Application of International Application No. PCT/FR2017/052689, filed Sep. 29, 2017, which is incorporated by reference in its entirety and published as WO 2018/060657 A1 on Apr. 5, 2018, not in English.

BACKGROUND OF THE INVENTION

The invention pertains to the general field of telecommunications.

It relates more particularly to the detection of intrusions on a telecommunications network via which a sender device and a receiver device exchange encrypted traffic.

As is known, the SSL (Secure Sockets Layer) and more recently TLS (Transport Layer Security) protocols are security protocols that are commonly used on networks, such as for example on the public Internet network using the HTTPS (HyperText Transfer Protocol Secure) protocol for ensuring confidentiality of exchanges. These protocols make it possible to protect any item of sensitive data shared by various devices on the network, by encrypting the exchanges between these devices. Unfortunately, this encryption renders existing intrusion detection techniques powerless, these being incapable of inspecting the encrypted traffic exchanged on the network.

Specifically, systems for detecting and protecting against intrusions (also commonly known as IDS (intrusion detection systems) and IPS (intrusion protection systems)) are conventionally configured so as to monitor the traffic exchanged on the network and identify signatures or characteristic behaviors in this traffic that are associated with various threats liable to affect the network, such as for example the intrusion of malicious software or malware, the leakage of sensitive data, attacks carried out against the network, etc. To this end, these systems perform a deep packet inspection (more commonly known as DPI), which consists in analyzing the content of a network packet (for example IP packet) and not just its header, and in comparing this content with signatures or else keywords (or patterns), which are characteristic of known attack scenarios. These signatures or keywords are determined and provided by security companies or companies providing other software with an open source code (i.e. "open source"), who compete with one another to provide an up-to-date catalog of signatures covering the widest possible range of attacks, with the knowledge that new attacks occur every day.

The common point of these IDS systems is that they are based on analyzing communications transmitted in open form on the network so as to be able to compare the content of these communications with the signatures established beforehand by the security companies. Using security procedures such as SSL or TLS on the network therefore makes it impossible to use these systems as things stand, such that information systems that hinge on encrypted exchanges on the network are vulnerable to numerous cyber-attacks.

To overcome this limitation, numerous security companies provide applications that behave in an unsecured manner by positioning themselves as a "man in the middle" on an SSL/TLS connection linking a sender device to a receiver device, so as to intercept the communications between these two devices. This interception is implemented by using false trust certificates, which make it possible to break end-to-end the encryption used between the two devices and to access the content of their exchanges in open form.

Although such a solution is satisfactory from the point of view of detecting intrusions, it still poses ethical and legal problems, and problems in terms of confidentiality and protecting the privacy of users, such that numerous web browsers nowadays incorporate plug-ins that make it possible to detect and revoke false trust certificates used by IDS systems.

It has thus long been thought that it was impossible to simultaneously meet both conditions of securing the network in terms of monitoring and detecting intrusions and of guaranteeing the privacy of users through the encryption of their communications.

J. Sherry et al., in the document entitled "BlindBox: Deep Packet Inspection over Encrypted Traffic", SIGCOMM'15, 17-21 Aug. 2015, propose a technique for inspecting encrypted traffic using advanced encryption protocols. This technique makes it possible to detect attacks carried out on encrypted traffic via an IDS proxy situated in the traffic flow (also known as "middlebox"). It hinges on the security company providing, in open form, keywords to be sought in the traffic, and the encryption, by the IDS proxy, of these keywords before each encrypted connection (for example upon each SSL connection) implemented between a sender device and a receiver device. The IDS proxy then compares the thus-encrypted keywords with the traffic exchanged between the sender device and the receiver device. If a match is detected, the traffic is considered to be suspect, and various actions may then be taken, such as for example sending a notification to the administrator of the network, deleting the packet considered to be suspect, stopping the connection between the sender device and the receiver device, etc.

However, the solution proposed by Sherry et al. suffers from a major drawback, namely that it is incompatible with the rules imposed nowadays by the ecosystem in which security companies and IDS systems play a part. Specifically, as mentioned previously, the solution proposed by Sherry et al. requires all of the keywords and detection rules (for example combination of a plurality of keywords) provided by the security company to be accessible in open form to the IDS proxy so that it is able to encrypt them, and therefore, more generally, to each IDS proxy present in the network. Although this is not a constraint from a theoretical point of view, it is completely out of line with the practice of security companies, for obvious economic reasons, as bases of keywords and other detection rules are what form the added value of security companies. Therefore, although it is able to be contemplated in theory, the solution proposed by Sherry et al. is not applicable in practice in a network.

Furthermore, for the sake of effectiveness, it is very often the case that one and the same IDS system is configured so as to use keywords or signatures from various security companies. In the likely absence of harmonization between security companies, the IDS proxy proposed by J. Sherry et al. would therefore have to be able to integrate signatures in open form, potentially having various formats or various semantics. This leads to a great deal of implementation complexity, which is difficult to contemplate in practice for such a device.

Aim and Summary of the Invention

The invention makes it possible to rectify these drawbacks by proposing a method for detecting intrusions on a network via which a sender device and a receiver device communicate, this detection method using a searchable encryption algorithm defined by a key generation algorithm, an encryption/decryption procedure, a trapdoor generation algorithm, and a test procedure able to use said trapdoors, said detection method comprising:

- a step of generating, by way of said key generation algorithm, a trapdoor bypass key intended for a security device able to determine a plurality of keywords characteristic of intrusions liable to affect the network;
- a step of generating, by the security device, a trapdoor for each keyword of said plurality of keywords by using said trapdoor generation algorithm parameterized by the trapdoor bypass key, each trapdoor generated for a keyword making it possible to detect a character string representative of a cipher of this keyword obtained by way of said encryption/decryption procedure;
- a step of providing, by the security device, the trapdoors generated for said plurality of keywords to an intrusion detection device located in the network between the sender device and the receiver device;
- a step of intercepting, by the intrusion detection device, a plurality of encrypted character strings sent on the network by the sender device to the receiver device, said plurality of encrypted character strings resulting from the encryption of a plurality of character strings resulting from the sender device dividing a message intended for the receiver device, said encryption being performed by way of said encryption/decryption procedure and of a public encryption key associated with the receiver device;
- a step of applying, by the intrusion detection device, the test procedure to the plurality of intercepted encrypted character strings, said test procedure using the trapdoors provided by the security device in order to detect whether there is at least one encrypted character string from among said plurality of intercepted encrypted character strings representative of at least one cipher of a keyword from among said plurality of keywords; and
- a step of detecting an intrusion on the network if the intrusion detection device detects the existence of such an intercepted encrypted character string.

The invention also targets a method for monitoring a network by an intrusion detection device by way of a searchable encryption algorithm defined by a key generation algorithm, an encryption/decryption procedure, a trapdoor generation algorithm, and a test procedure able to use said trapdoors, said intrusion detection device being located on the network between a sender device and a receiver device, said monitoring method comprising:

- a step of obtaining, from a security device having a plurality of keywords characteristic of intrusions liable to be committed on the network, a plurality of trapdoors generated by the security device for said plurality of keywords by using said trapdoor generation algorithm parameterized by a trapdoor bypass key generated for the security device by way of said key generation algorithm, said keywords being kept secret from the intrusion detection device by the security device;
- a step of intercepting a plurality of encrypted character strings sent on the network by the sender device to the receiver device, said plurality of encrypted character strings resulting from the encryption of a plurality of character strings resulting from the sender device dividing a message intended for the receiver device, said encryption being performed by way of said encryption/ decryption procedure and of a public encryption key associated with the receiver device;
- a step of applying the test procedure to the plurality of intercepted encrypted character strings, said test procedure using the trapdoors provided by the security device to detect whether there is at least one encrypted character string from among said plurality of intercepted encrypted character strings representative of at least one cipher of a keyword from among said plurality of keywords; and
- a step of detecting an intrusion on the network if the intrusion detection device detects the existence of such an intercepted encrypted character string.

In correlation, the invention also relates to a device for detecting intrusions on a network, configured so as to use a searchable encryption algorithm defined by a key generation algorithm, an encryption/decryption procedure, a trapdoor generation algorithm, and a test procedure able to use said trapdoors, said intrusion detection device being intended to be located on the network between a sender device and a receiver device and comprising:

- an obtaining module, able to obtain, from a security device having a plurality of keywords characteristic of intrusions liable to be committed on the network, a plurality of trapdoors generated by the security device for said plurality of keywords by using said trapdoor generation algorithm parameterized by a trapdoor bypass key generated for the security device by way of said key generation algorithm, said keywords not being known to the intrusion detection device;
- an interception module, configured so as to intercept a plurality of encrypted character strings sent on the network by the sender device to the receiver device, said plurality of encrypted character strings resulting from the encryption of a plurality of character strings resulting from the sender device dividing a message intended for the receiver device, said encryption being performed by way of said encryption/decryption procedure and of a public encryption key associated with the receiver device;
- A test module, configured so as to apply said test procedure to the plurality of intercepted encrypted character strings, this test procedure using the trapdoors obtained from the security device in order to detect whether there is at least one encrypted character string from among said plurality of intercepted encrypted character strings representative of at least one cipher of a keyword from among said plurality of keywords; and
- a module for detecting the existence of an intrusion affecting the network, activated if the test module detects the existence of such an intercepted encrypted character string.

The invention also targets a system for detecting intrusions on a network via which a sender device and a receiver device are able to communicate, this detection system being configured so as to use a searchable encryption algorithm defined by a key generation algorithm, an encryption/decryption procedure, a trapdoor generation algorithm, and a test procedure able to use said trapdoors, the detection system comprising:

- a security device, able to determine a plurality of keywords characteristic of intrusions liable to affect the network;
- an intrusion detection device according to the invention located in the network between the sender device and the receiver device; and
- at least one key generation module configured so as to generate a trapdoor bypass key intended for the security device by way of the key generation algorithm;

and wherein the security device comprises:
  a trapdoor generation module configured so as to generate a trapdoor for each keyword of said plurality of keywords by using said trapdoor generation algorithm parameterized by the trapdoor bypass key, each trapdoor generated for a keyword making it possible to detect a character string representative of a cipher of this keyword obtained by way of the encryption/decryption procedure; and
  a provision module, configured so as to provide the trapdoors generated for the keywords to the intrusion detection device, while at the same time keeping said keywords secret from the intrusion detection device.

It is noted that there is no limitation attached to the way in which an intrusion detected by the intrusion detection device is processed. The detection of such an intrusion may thus for example be subject only to a notification sent by the intrusion detection device to the administrator of the network, or trigger a corrective action, such as for example rejection of the examined message, interruption of the connection between the sender device and the receiver device, etc.

The invention thus proposes a novel approach for encrypting communication between a sender device and a receiver device, while at the same time maintaining the possibility of DPI (i.e. deep packet inspection) intrusion detection on the network by an intermediate device or else a "middlebox" that is situated between the sender device and the receiver device (intrusion detection device within the meaning of the invention). In other words, the invention offers the possibility of ensuring the security of the network, while at the same time guaranteeing users of this network that their exchanges will be kept confidential.

This approach hinges on the use of a searchable encryption algorithm that makes it possible to perform equality tests between keywords defined by a security company (security device within the meaning of the invention) and potentially malicious traffic exchanged in encrypted form on the network between the sender device and the receiver device. Such a searchable encryption algorithm is conventionally defined by a cryptographic key generation algorithm, an encryption/decryption procedure, and by a trapdoor generation algorithm and a test procedure able to use said trapdoors.

As is known in cryptography, a trapdoor associated with a word or more generally with a message is an item of information that is difficult to invert without knowledge of the key that made it possible to bypass it (in other words without an item of information on the basis of which it is virtually impossible to access the message for which it was generated), and which makes it possible to perform a particular action that would not be able to be performed if such an item of information were not possessed. In this case here, the trapdoors generated for the various keywords established by the security device make it possible to perform equality tests on encrypted data exchanged between the sender device and the receiver device, said data having been encrypted by way of the encryption procedure associated with the searchable encryption algorithm. More particularly here, the trapdoors generated for the various keywords established by the security company allow the intrusion detection device to compare data in encrypted form with the keywords, without however having direct access to these keywords in open form.

Thus, according to the invention, only "trapdoors" generated by the security device itself from keywords that it has established beforehand are provided thereby to the intrusion detection device. Providing these trapdoors allows the security device to dispense with providing the keywords in open form to the intrusion detection device. The use of a searchable encryption algorithm as proposed by the invention therefore advantageously allows the security company to keep the keywords that it has established to detect intrusions secret from the intrusion detection device. The approach proposed by the invention is therefore completely compatible with existing economic models of security companies: no detection rule and no keyword is provided in open form by the security company to the intrusion detection device.

Furthermore, by providing only trapdoors to the intrusion detection device without ever providing it with the keywords associated with these trapdoors in open form, the invention makes it possible to standardize the formats and the semantics of the information used by the intrusion detection device to detect possible attacks on the network. This results in simplified implementation in terms of the intrusion detection device.

It should be noted that the invention may apply both in a context in which the sender device and the receiver device are both honest and in a context in which at least one of these devices is "dishonest", that is to say that it may be at the origin of an intrusion carried out on the network (intentionally or unintentionally) or collaborate with the entity at the origin of this intrusion. This corresponds for example to a case in which the sender device, control of which has been taken by an attacker, transmits sensitive data that are received and expected by the receiver device. Such a context is of vital importance, since it is nowadays observed that the majority of attacks stem from information systems themselves, via malicious software that takes control of terminals of the information systems. Therefore, the sender device and also the receiver device are able to be corrupted relatively easily by a malicious remote entity, which is able to take full or partial control thereof (for example, an infected victim terminal may leak sensitive data to its master software via such taking of control). However, we will limit ourselves here to the case in which the two devices are "dishonest" independently of one another, that is to say that no prior agreement has been drawn up between them (for example in order to transmit sensitive data specifically by dividing and transmitting these data such that the method would be ineffective for detecting the way in which the data leakage occurred). By contrast, the approach proposed in the document by J. Sherry et al. does not make it possible to manage a situation in which the sender and receiver devices are both dishonest independently of one another.

In one particular embodiment, the trapdoor bypass key is independent of a private decryption key of the receiver device associated with the public encryption key of the receiver device. It is generated for example by the security device by way of the key generation algorithm associated with the searchable encryption algorithm. In any case, it is of course kept secret from the intrusion detection device.

The cryptographic key management proposed in this embodiment is particularly advantageous: specifically, having a trapdoor bypass key independent of the private encryption key of the receiver device makes it possible to use the same trapdoor bypass key for various receiver devices communicating on the network. In other words, the trapdoors associated with the keywords defined by the security device may be generated just once by the security device and then used by the intrusion detection device to manage a plurality of secure connections (for example SSL connection). It is not necessary to generate trapdoors for each new secure connection that the intrusion detection device has to monitor. In this embodiment, the invention therefore allows a substantial gain in terms of complexity in comparison with the concept proposed in the document by Sherry et al., which requires the keywords to be encrypted by the proxy upon each new connection between a sender device and a receiver device.

It furthermore offers the possibility of easily and quickly taking into account an update to the keywords by the security company, for example due to the appearance of new types of intrusion liable to affect the network.

In one particular embodiment, the intrusion detection method, respectively the monitoring method, comprises, after the step of applying the test procedure, if no intrusion has been detected by the intrusion detection device:

a step of reconstructing, by the intrusion detection device, an encrypted version of the message from the plurality of intercepted encrypted character strings; and a step of transmitting, by the intrusion detection device, this encrypted version of the message to the receiver device.

In correlation, the intrusion detection device furthermore comprises a reconstruction module and a transmission module, which are activated by the test module when no intrusion has been detected on the network, the reconstruction module being configured so as to reconstruct an encrypted version of the message from the plurality of intercepted encrypted character strings, and the transmission module being configured so as to transmit this encrypted version of the message to the receiver device.

By transmitting an encrypted version of the message, reconstructed by the intrusion detection device, to the receiver device, this embodiment offers the receiver device the possibility of decrypting this encrypted version rather than a message formulated directly by the sender device and that has not undergone any check from the intrusion detection device. This embodiment thus allows the receiver device to protect itself against a dishonest sender device, which may for example send a message intended to be decrypted by the receiver device and that may contain a virus, whereas the plurality of character strings purportedly resulting from the division of this message and that is intended to be analyzed by the intrusion detection device would be exempt from a virus. By ensuring that the decryption performed by the receiver device is based on the encrypted version of the message, reconstructed by the intrusion detection device, there is defense against such a situation.

In one particular embodiment, in the step of providing the monitoring method, the security device furthermore provides the intrusion detection device with detection rules to be applied in the test step.

Providing detection rules in addition to the trapdoors associated with the keywords allows the intrusion detection device to carry out more complete equality tests, relating for example to Boolean combinations of keywords, rather than keywords on their own. It is noted that knowledge of these rules, which structures the search performed by the intrusion detection device, so to speak, is gained independently of the knowledge of the keywords, and does not require the security device to disclose the keywords to the intrusion detection device.

In one particular embodiment, the size of the character strings resulting from the message being divided is set depending on the size of the keywords determined by the security device. Typically, dividing a message into character strings of size k, k denoting an integer greater than 1, makes it possible to test keywords of size k. The division may be performed by the sender device, using a sliding window of size k that it moves over the message one character at a time. If keywords of different sizes are determined by the security device, such division of the message may be repeated for each different keyword size.

According to another aspect, the invention targets a method for communication between a sender device and a receiver device via a network, this communication method using a searchable encryption algorithm defined by a key generation algorithm, an encryption/decryption procedure, a trapdoor generation algorithm, and a test procedure able to use said trapdoors, said communication method comprising:

a step of dividing, by the sender device, a message intended for the receiver device into a plurality of character strings;

a step of encrypting, by the sender device, the plurality of character strings by way of said encryption/decryption procedure and of a public encryption key associated with the receiver device;

a step of sending, by the sender device, said plurality of encrypted character strings to the receiver device, said plurality of encrypted character strings being intercepted by the intrusion detection device;

a step of detecting intrusions in accordance with an intrusion detection method according to the invention using the searchable encryption algorithm; and a step of decrypting, by the receiver device, an encrypted version of the message by way of said encryption/decryption procedure.

In correlation, the invention also targets a communication system configured so as to use a searchable encryption algorithm, this searchable encryption algorithm being defined by a key generation algorithm, an encryption/decryption procedure, a trapdoor generation algorithm, and a test procedure able to use said trapdoors. The communication system comprises, according to the invention:

a sender device and a receiver device that are able to communicate via a network, said receiver device having a key pair comprising a public encryption key and a private decryption key; and a system for detecting intrusions on said network according to the invention and configured so as to use said searchable encryption algorithm, this detection system comprising a security device and an intrusion detection device according to the invention located in the network between the sender device and the receiver device;

wherein:

the sender device comprises:

a division module, configured so as to divide a message intended for the receiver device into a plurality of character strings;

an encryption module, configured so as to encrypt the plurality of character strings by way of said encryption/decryption procedure and of the public encryption key associated with the receiver device; and a sending module, configured so as to send said plurality of encrypted character strings to the receiver device, said plurality of encrypted character strings being intercepted by the intrusion detection device; and the receiver device comprises a decryption module, configured so as to decrypt an encrypted version of the message by way of said encryption/decryption procedure.

The method and the communication system benefit from the same advantages as those cited above for the monitoring and intrusion detection methods and for the device and the intrusion detection system according to the invention.

It is also possible to contemplate, in other embodiments, the intrusion detection method, the intrusion detection system, the communication method and the communication system according to the invention having all or some of the abovementioned features in combination.

In one particular embodiment, the various steps of the intrusion detection method are determined by instructions of computer programs distributed on the security device and on the intrusion detection device.

As a result, the invention also targets a computer program on an information medium, this program being able to be implemented in a security device or more generally in a computer, this program including instructions suitable for implementing the steps of generating a trapdoor bypass key, of generating trapdoors and of providing trapdoors of an intrusion detection method such as described above.

The invention also targets a computer program on an information medium, this program being able to be implemented in an intrusion detection device or more generally in a computer, this program including instructions suitable for implementing the steps of intercepting, of applying and of detecting an intrusion of an intrusion detection method such as described above or suitable for implementing the steps of a monitoring method such as described above.

Each of these programs may use any programming language, and be in the form of source code, object code, or of intermediate code between source code and object code, such as in a partially compiled form, or in any other desirable form.

The invention also targets a computer-readable information medium or recording medium including computer program instructions, such as mentioned above.

The information medium or recording medium may be any entity or device capable of storing the program. For example, the medium may include a storage means, such as a ROM, for example a CD-ROM or a microelectronic circuit ROM, or else a magnetic recording means, for example a floppy disk or a hard disk.

Moreover, the information medium or recording medium may be a transmissible medium such as an electrical or optical signal, which may be routed via an electrical or optical cable, by radio or by other means. The program according to the invention may in particular be downloaded from an Internet network.

As an alternative, the information medium or recording medium may be an integrated circuit in which the program is incorporated, the circuit being designed to execute or to be used in the execution of the method in question.

BRIEF DESCRIPTION OF THE DRAWINGS

Other features and advantages of the present invention will emerge from the description given below, with reference to the appended drawings which illustrate an exemplary embodiment thereof that is in no way limiting. In the figures.

DETAILED DESCRIPTION OF THE INVENTION

Figure 1:
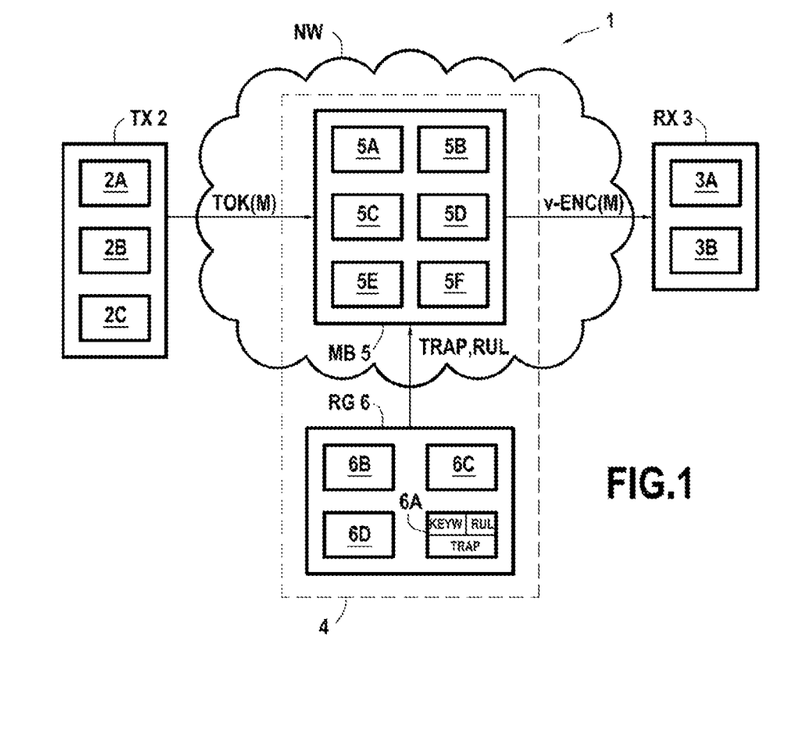
FIG. 1 schematically shows a communication system according to the invention, in one particular embodiment.

FIG. 1 shows, in its environment, a communication system 1 according to the invention, in one particular embodiment.

The communication system 1 comprises:
 a sender device TX 2;
 a receiver device RX 3; and
 an intrusion detection system 4 according to the invention.

The sender device TX 2 and the receiver device RX 3 are able to communicate with one another via a telecommunications network NW. There is no limitation attached to the nature of this network, besides the fact that, on this network, the communications between the sender device TX 2 and the receiver device RX 3 are secured via the use of a cryptographic encryption algorithm, described below. The network NW may thus indiscriminately be a public network, such as the Internet, or a private network, a fixed or mobile network, a wired or wireless network, it may consist of a single network or be formed of a plurality of sub-networks, etc.

The intrusion detection system 4 is configured so as to allow the detection of intrusions liable to affect communications on the network NW, and more particularly here, in the example under consideration in FIG. 1, communications between the sender device TX 2 and the receiver device RX 3. To this end, it comprises:
 an intrusion detection device MB 5 (also known as a "middlebox"), according to the invention, which is situated in the network NW in the flow between each sender device TX capable of sending data on this network and each receiver device RX capable of receiving data via this network. In this case here, in the example illustrated in FIG. 1, the intrusion detection device MB 5 is located in the network NW between the sender device TX 2 and the receiver device RX 3. It is configured so as to intercept exchanges on the network NW between these two devices; and
 a security device RG 6, managed by (i.e. under the control of) a security company able to determine (that is to say to establish) a plurality of keywords KEYW (or patterns or else signatures) characteristic of intrusions liable to affect the network NW, and, in the embodiment described here, one or more detection rules RUL specific to these keywords. Such detection rules define for example combinations of several keywords, such as logic combinations defined by way of logic or Boolean operators such as OR, AND, XOR (exclusive OR) operators, etc. In the embodiment described here, the keywords KEYW and detection rules RUL established by the security company are stored in a non-volatile memory (referenced by 6A in FIG. 2) of the security device RG 6.

The way in which the keywords KEYW and the detection rules RUL are determined by the security company is known per se, and depends on the know-how of each security company. It is not described in detail here. It is noted that the keywords KEYW and the detection rules RUL associated with these keywords are liable to change or to be updated, for example following the appearance of new types of intrusion liable to affect the network NW.

Furthermore, it should also be noted that one and the same security company may have to interact with a plurality of separate intrusion detection devices, which are situated in the same network or in different networks. Similarly, an intrusion detection device located in a network may have to interact with a plurality of security companies (and therefore with a plurality of security devices managed respectively by these security companies). However, for the sake of simplicity, we limit ourselves here to one security company and to one intrusion detection device.

According to the invention, a deep packet inspection or DPI is permitted on the network NW, even though the communications between the sender device TX 2 and the receiver device RX 3 are encrypted, this being permitted without the security company having to disclose the keywords that it has established in order to detect intrusions affecting the network NW to the intrusion detection device MB 5. Furthermore, this DPI inspection is permitted without the traffic exchanged between the sender device TX and the receiver device RX being disclosed to the intrusion detection device MB 5, even partially, such that the confidentiality of the exchange between the two devices is preserved and their privacy is guaranteed. To this end, the invention hinges on a searchable encryption algorithm, denoted ALG-DSE (for decryptable searchable encryption), and more particularly, in the embodiment described here, on the searchable encryption algorithm described in the article by T. Fuhr and P. Paillier entitled "Decryptable Searchable Encryption", ProvSec 2007, volume 4784 of *Lecture Notes on Computer Science*, pages 228-236, Springer, 2007.

As is known, such an algorithm is defined by a plurality of procedures that are detailed below, namely:
  a key generation algorithm, denoted KEYGEN, parameterized by a security parameter A that is known per se, here taken for example to be equal to 128 bits, in accordance with the security recommendations in force;
  an encryption/decryption procedure comprising an encryption algorithm ENC and a decryption algorithm DEC;
  a trapdoor generation algorithm TRAP, denoted TRAPGEN; and
  a test procedure, denoted TEST, able to use the trapdoors generated via the algorithm TRAPGEN.

A trapdoor TRAP is an element or an item of information that makes it possible to perform a particular action only when there is possession of this trapdoor. In this case here, the trapdoors TRAP generated via the trapdoor generation algorithm TRAPGEN allow the intrusion detection device MB 5 to perform equality tests, defined by the test procedure TEST, on the data packets (more generally denoted by messages in the description) exchanged between the sender device TX 2 and the receiver device RX 3, provided that these data packets (messages) are encrypted by way of the encryption procedure ENC associated with the searchable encryption algorithm ALG-DSE. In this way, the invention makes it possible to disclose only the trapdoors TRAP to the intrusion detection device MB 5, and to keep the keywords KEYW established by the security company and stored in the memory of the security device RG 6, for example in the non-volatile memory 6A, secret from the intrusion detection device MB 5.

Figure 2:
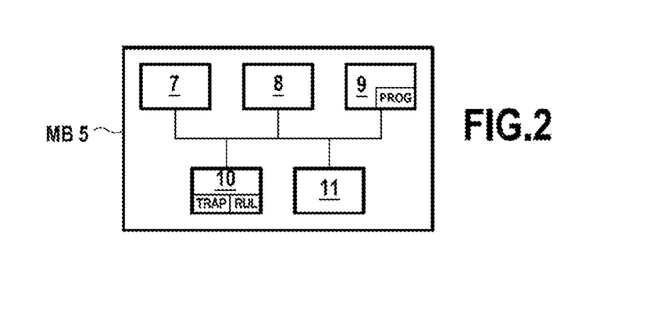
FIG. 2 illustrates the hardware architecture of an intrusion detection device according to the invention, belonging to the communication system of FIG. 1.

In the embodiment described here, the intrusion detection device MB 5 has the architecture of a computer, as illustrated in FIG. 2. It comprises in particular a processor 7, a random access memory 8, a read-only memory 9, a non-volatile flash memory 10 and communication means 11 allowing it firstly to intercept any communication between the sender device TX 2 and receiver device RX 3 on the network NW, and secondly to communicate with the security device RG 6. Such means are known per se and are not described in more detail here.

The read-only memory 9 of the intrusion detection device MB 5 constitutes a recording medium according to the invention, able to be read by the processor 7 and on which there is recorded here a computer program PROG according to the invention.

The computer program PROG here defines functional and software modules that are configured so as to implement the steps of a method for monitoring the network NW and some steps of an intrusion detection method according to the invention. These functional modules hinge on and/or control the hardware elements 7-11, cited above, of the intrusion detection device MB 5. They comprise here in particular, as illustrated in FIG. 1:
  an obtaining module 5A, able to obtain, from the security device RG 6, the trapdoors TRAP generated thereby for the plurality of keywords KEYW and, in the embodiment described here, the detection rules RUL;
  an interception module 5B, configured so as to intercept a plurality of encrypted character strings, also commonly called "encrypted tokens" and denoted TOK here, sent on the network NW by the sender device TX 2 to the receiver device RX 3. As described below, the character strings that are encrypted stem from the division (or parsing) of a message M formulated by the sender device TX 2 and intended for the receiver device RX 3;
  a test module 5C, configured so as to apply the test procedure TEST associated with the searchable encryption algorithm ALG-DSE to the plurality of encrypted character strings TOK intercepted by the interception module 5B. The test procedure TEST uses the trapdoors obtained by the obtaining module 5A in order to detect whether there is at least one encrypted character string from among the encrypted character strings TOK intercepted by the interception module 5B representative of a cipher of at least one keyword from among the keywords KEYW; and
  a module 5D for detecting the existence of an intrusion affecting the network, activated if the test module 5C detects the existence of such an intercepted encrypted character string.

In the embodiment described here, the computer program furthermore defines two other functional modules, activated by the test module when no intrusion has been detected on the network, namely:
  a reconstruction module 5E configured so as to reconstruct an encrypted version vENC(M) of the message M formulated by the sender device TX 2 from the plurality of encrypted character strings TOK intercepted by the interception module 5B; and
  a transmission module 5F, configured so as to control the communication means 11 of the intrusion detection device so as to transmit this encrypted version vENC (M) of the message M to the receiver device RX 3.

The functions of these various modules 5A-5F are described in more detail below. The security device RG 6 also has here the hardware architecture of a computer, this architecture being identical to that of the intrusion detection device MB 5, that is to say that it comprises a processor, a random access memory, a read-only memory, the non-volatile flash memory 6A, and communication means allowing it to communicate with the intrusion detection device MB 5. The read-only memory of the security device constitutes a recording medium, able to be read by the processor of the security device and on which there is recorded here a computer program defining functional modules, configured so as to implement some steps of the intrusion detection method according to the invention. These functional modules hinge on and/or control the hardware elements, cited above, of the security device RG 6. They comprise here in particular, as illustrated in FIG. 1:

- a key generation module 6B configured so as to generate, by way of the key generation algorithm KEYGEN of the searchable encryption algorithm ALG-DSE, a trapdoor bypass key, denoted tk(RG), for the security device RG 6;
- a trapdoor generation module 6C configured so as to generate a trapdoor for each keyword of the plurality of keywords KEYW using the trapdoor generation algorithm TRAPGEN of the searchable encryption algorithm ALG-DSE, parameterized by the trapdoor bypass key tk(RG), each trapdoor generated for a keyword making it possible to detect a character string representative of a cipher of this keyword obtained by way of the encryption procedure ENC of the searchable encryption algorithm ALG-DSE; and
- a provision module 6D controlling the communication means of the security device RG 6, and configured so as to provide the trapdoors TRAP generated for the keywords KEYW to the intrusion detection device MB 5, while at the same time keeping the keywords KEYW secret from the intrusion detection device MB 5.

The functions of these various modules 6B-6D are described in more detail below.

It is noted that there is no limitation attached to the nature of the sender device TX 2 and receiver device RX 3. These may be computers, servers, or any terminals, provided that these are able to communicate securely on the network NW by in this case using the encryption ENC/decryption DEC procedure associated with the searchable encryption algorithm ALG-DSE. In the embodiment described here, this encryption/decryption procedure is an asymmetric encryption/decryption procedure hinging on a key pair generated for the receiver device RX 3 and comprising a public encryption key pk(RX) and a private decryption key sk(RX) kept secret by the receiver device RX 3.

In the embodiment described here, the sender device TX 2 and receiver device RX 3 have the hardware architecture of a computer, this architecture being identical to that of the intrusion detection device MB 5, that is to say that they comprise a processor, a random access memory, a read-only memory, the non-volatile flash memory, and communication means allowing them to communicate on the network NW.

The read-only memory of the sender device TX 2 constitutes a recording medium, able to be read by the processor of the sender device TX 2 and on which there is recorded here a computer program defining functional modules hinging on and/or controlling the hardware elements, cited above, of the sender device TX 2. These functional modules comprise here in particular, as illustrated in FIG. 1:

- a division module 2A, configured so as to divide a message M formulated by the sender device TX 2 and intended for the receiver device RX 3 into a plurality of character strings or "tokens";
- an encryption module 2B, configured so as to encrypt the plurality of character strings by way of said encryption procedure ENC of the searchable encryption algorithm ALG-DSE and of the public encryption key pk(RX) of the receiver device; and
- a sending module 2C, configured so as to send said plurality of encrypted character strings TOK to the receiver device RX 3 via the network NW.

Moreover, the read-only memory of the receiver device RX 3 constitutes a recording medium, able to be read by the processor of the receiver device RX 3 and on which there is recorded here a computer program defining functional modules hinging on and/or controlling the hardware elements, cited above, of the receiver device RX 3. These functional modules comprise here in particular, as illustrated in FIG. 1:

- a key generation module 3A, configured so as to execute the key generation algorithm KEYGEN of the searchable encryption algorithm ALG-DSE in order to generate the public pk(RX) and private sk(RX) key pair of the receiver device RX 3; and
- a decryption module 3B, configured so as to decrypt an encrypted version vENC(M) of the message M, reconstructed and transmitted by the intrusion detection device MB 5, by way of the decryption procedure DEC of the searchable encryption algorithm ALG-DSE.

The functions of the various modules 2A-2C and 3A, 3B of the sender device TX 2 and receiver device RX 3 are described in more detail below.

It is noted that, in another embodiment, the public/private key pair allocated to the receiver device RX 3 may be generated by a trusted authority and then transmitted by this authority to the receiver device RX 3, the public encryption key pk(RX) moreover being made public, in particular to the sender device TX 2.

Moreover, in the embodiment described here, it is assumed that the device 2 is the sender of the message M and the device 3 is the recipient of this message. Of course, these roles are interchangeable, and the device 2 may be equipped with modules identical to the modules 3A and 3B of the device 3 in order to receive encrypted messages via the network NW, just as the device 3 may be equipped with modules identical to the modules 2A-2C of the device 2 in order to send encrypted messages on the network NW.

Figure 3:
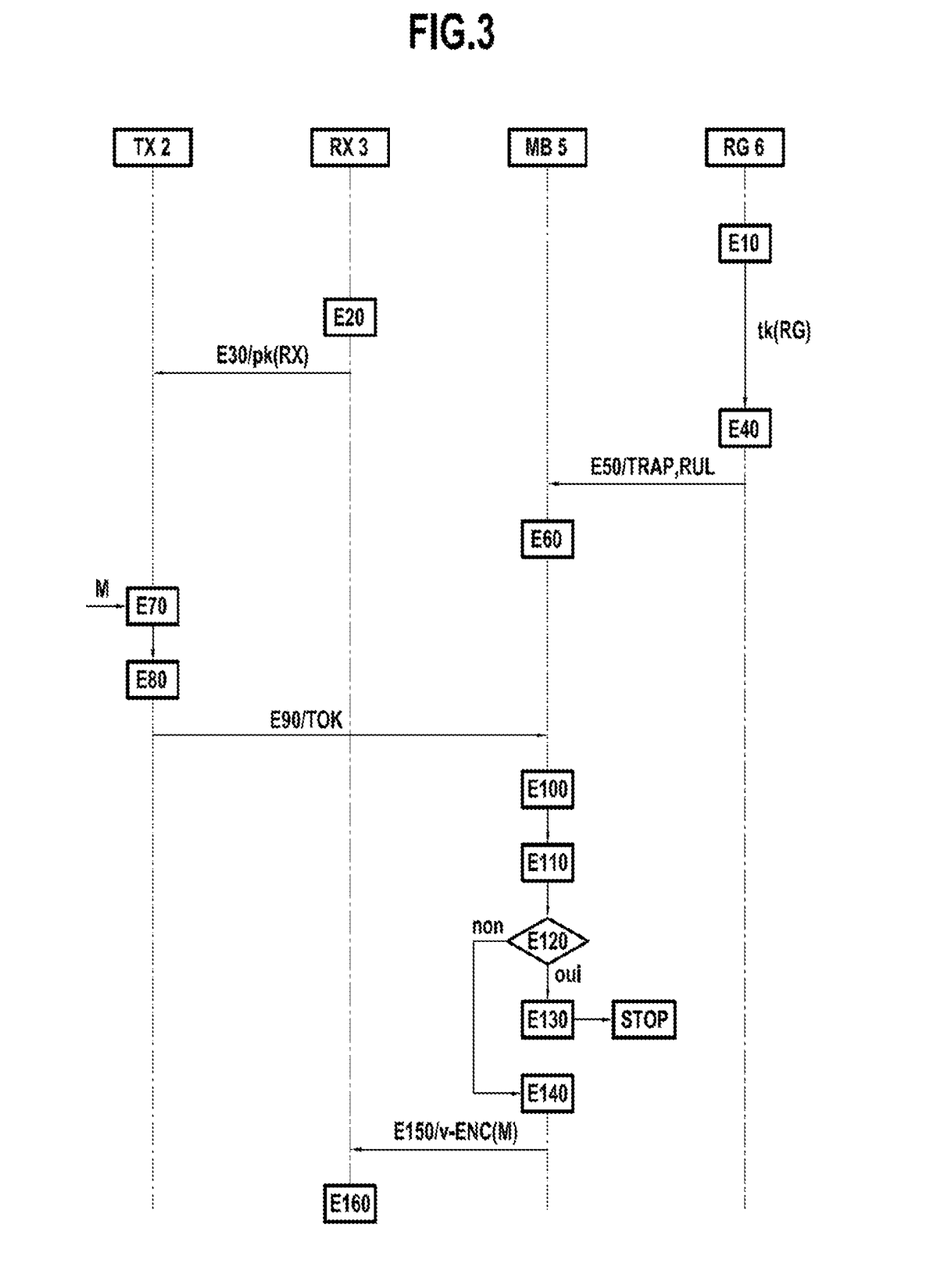
FIG. 3 illustrates a diagram of the main steps of a communication method, of an intrusion detection method and of a monitoring method according to the invention in one particular embodiment in which they are implemented by the entities forming the communication system of FIG. 1.

A description will now be given, with reference to FIG. 3, of the main steps of a communication method according to the invention, as is implemented by the communication system 1 of FIG. 1. As emerges in the remainder of the description, this communication method incorporates the steps of an intrusion detection method according to the invention as is implemented by the intrusion detection system 4 of FIG. 1, which itself incorporates the steps of a method for monitoring the network NW as is implemented by the intrusion detection device MB 5 of FIG. 1.

It is assumed here that, during an initialization phase, the security device RG 6 generates its trapdoor bypass key tk(RG) by executing, by way of its module 6A, the key generation algorithm KEYGEN of the searchable encryption algorithm ALG-DSE, parameterized by the security parameter $\lambda$, where $\lambda=128$ bits here (step E10). This trapdoor bypass key tk(RG) is kept secret by the security device RG 6.

In one variant embodiment, the trapdoor bypass key tk(RG) is derived by a trusted authority equipped with a key generation module using the key generation algorithm KEYGEN of the searchable encryption algorithm ALG-DSE, parameterized by the security parameter $\lambda$. In this variant embodiment, the trusted authority then securely transmits the trapdoor bypass key tk(RG) to the security device RG 6.

Moreover, during the initialization phase, each receiver device, and more particularly here the receiver device RX 3, also executes, by way of its module 3A, the key generation algorithm KEYGEN of the searchable encryption algorithm ALG-DSE, parameterized by the security parameter λ=128 bits, in order to generate its public pk(RX) and private sk(RX) key pair (step E20). The public key pk(RX) of the receiver device RX 3 is shared with the sender device TX 2 (step E30).

It is noted that, in the embodiment described here, as mentioned above, the searchable encryption algorithm used by the communication system 1 is the algorithm described in the article by Fuhr and Paillier. This algorithm is noteworthy in that the key generation algorithm KEYGEN associated with this algorithm makes it possible to generate a trapdoor bypass key tk(RG) for the security device RG 6 that is independent of the private key sk(RX) generated for the receiver device RX 3.

In one variant embodiment, the security device RG 6 uses a first key generation algorithm to generate the trapdoor bypass key tk(RG), whereas the receiver device RX 3 uses a second key generation algorithm to generate, independently of the trapdoor bypass key tk(RG), the public key pk(RG)/private key sk(RG) pair, the first and second algorithms being separate from and independent of one another.

Following the generation of its trapdoor bypass key tk(RG), the security device RG 6 generates, via its module 6C, a trapdoor TRAP(k–i) for each keyword k–i of said plurality of keywords KEYW stored in its non-volatile memory 6A, i=1, . . . , N, where N denotes an integer greater than 1 (step E40). To this end, the module 6C executes the trapdoor generation algorithm TRAPGEN parameterized by its trapdoor bypass key tk(RG). As is known, as mentioned in the abovementioned article by Fuhr and Paillier, each trapdoor TRAP(k–i) generated for a keyword k–i makes it possible to detect a character string representative of a cipher of this keyword obtained by way of the encryption procedure ENC of the searchable encryption algorithm ALG-DSE.

Next, the security device RG 6, by way of its provision module 6D and of its communication means, provides the trapdoors TRAP thus generated for the various keywords of the plurality of keywords KEYW to the intrusion detection device MB 5 (step E50). In the embodiment described here, the provision module 6D also provides the intrusion detection device MB 5 with the detection rules RUL by substituting the keywords in question with the trapdoors associated therewith in these detection rules RUL beforehand. In the embodiment described here, the detection rules RUL make it possible to search for logic combinations of keywords in addition to keywords on their own in the encrypted exchanges between the sender device TX 2 and the receiver device RX 3. They equivalently define, by substituting the keywords with the associated trapdoors, logic combinations of trapdoors to be sought in the encrypted traffic exchanged between the sender device TX 2 and the receiver device RX 3, and are transmitted in this form by the security device RG 6 to the intrusion detection device MB 5.

It is noted that the trapdoors TRAP and the detection rules RUL are transmitted by the security device RG 6 to the intrusion detection device MB 5 without disclosing the keywords KEYW to the intrusion detection device MB 5. In other words, at all times, the plurality of keywords KEYW established by the security device RG 6 is kept secret from the intrusion detection device MB 5, i.e. the intrusion detection device MB 5 never knows these keywords.

Furthermore, due to the independence of the trapdoor bypass key tk(RG) and of the private key sk(RX), it is noted that the trapdoors TRAP generated by the security device RG 6 and transmitted to the intrusion detection device MB 5 may be used by the latter to process the exchanges between the sender device TX 2 and the receiver device RX 3, but also between other pairs of sender/receiver devices. It is not necessary to generate new trapdoors upon each connection between a sender device and a receiver device.

The trapdoors TRAP and the detection rules RUL are stored by the intrusion detection device MB 5 in its non-volatile memory 10 (step E60).

It is now assumed that the sender device TX 2 wishes to send a message M to the receiver device RX 3. The message M may consist of one or more data packets. In the remainder of the description, for the sake of simplicity, consideration is given to a single data packet.

According to the invention, the message M is divided ("tokenized" or "parsed"), by the sender device TX 2 via its division module 2A, into a plurality of character strings, called tokens (step E70). In the embodiment described here, the size of the tokens resulting from the message M being divided is set depending on the size of the keywords determined by the security device RG 6.

More precisely, let us assume that the message M is formed of L bits M1, . . . , ML, and that the keywords specified by the security device RG 6 have sizes of k=3, 4 or 5 bits.

In the embodiment described here, for each possible keyword size k, the message M is divided by the module 2A by applying, to the message M, a sliding window of k bits, shifted successively by 1 bit, so as to obtain the following character strings wj (tokens): w1(k)=[M1, M2, . . . , Mk], w2(k)=[M2, M3 . . . , Mk+1], w3(k)=[M3, M4, . . . , Mk+2], etc. until the message M has been completely scanned.

It is noted that the size of the keywords determined by the security device RG 6 may be configured beforehand within the division module 2A (for example upon indication of the security device RG 6), or sizes set by default may be predefined in the sender device TX 2.

In another variant, the sender device TX 2 may apply another type of division, for example independent of the size of the keywords. This division may hinge for example on the presence of specific delimiters in the message M (for example presence of beacons, particular typographical characters) which naturally divide the message M into a plurality of character strings. It is noted that, in this variant, there is no redundancy between the character strings thus obtained by the module 2A, in contrast to the embodiment now described.

In yet another variant, the sender device TX 2 divides the message M into character strings having a fixed size, known to the security device RG 6, and it is the security device RG 6 that divides the keywords KEYW when their size is greater than the set size used by the sender device TX 2. In this case, the redundancy that is introduced is limited.

The character strings thus obtained by the module 2A for each size k are then encrypted by the encryption module 2B (step E80). To this end, the encryption module 2B uses the encryption procedure ENC of the searchable encryption algorithm ALG-DSE by using (i.e. parameterized by) the public encryption key pk(RX) of the receiver device RX 3. At the end of this step, it obtains a plurality of encrypted character strings or encrypted tokens TOK.

The sender device TX 2, via its sending module 2C and its communication means, then sends the plurality of encrypted character strings TOK on the network NW to the receiver device RX 3 (step E90).

The plurality of encrypted character strings TOK sent on the network NW by the sender device TX 2 is intercepted by the intrusion detection device MB 5 (step E100).

The intrusion detection device MB 5 then applies, via its test module 5C, to the plurality of intercepted encrypted character strings TOK, the test procedure TEST of the searchable encryption algorithm ALG-DSE (step E110).

To this end, it proceeds as described in the abovementioned article by Fuhr and Paillier, using the trapdoors TRAP and the detection rules RUL obtained in step E50 from the security device RG 6 and stored in its non-volatile memory 10.

More precisely, for each separate keyword size k, the test module 5C uses the encrypted character strings wj(k) corresponding to this keyword size k from among the intercepted strings TOK, and determines, by executing the test procedure TEST on each encrypted character string wj(k), by way of each of the trapdoors TRAP(i) corresponding to a keyword of size k determined by the security device RG 6, whether one of the character strings wj(k) corresponds to a keyword k–i of size k. In the example contemplated here, the test procedure TEST is configured so as to provide a "1" if a match exists (i.e. the tested encrypted character string corresponds, according to the trapdoor TRAP(i), to a cipher of a keyword k–i defined by the security device RG 6 and associated with the trapdoor TRAP(i)), and a "0" if not.

As the test procedure TEST used is identical to the one described in the abovementioned article by Fuhr and Paillier, it is not described in detail here. It is applied, by the test module 5C, to each intercepted encrypted character string and to each trapdoor provided by the security device RG 6. When detection rules RUL are furthermore specified, the test module 5C evaluates, from the results obtained independently for each trapdoor, the detection rules RUL as regular expressions applied to all of the trapdoors defining these detection rules RUL. The result of the evaluation of a detection rule RUL is equal here to 1 if the regular expression defined on the trapdoors is verified, given the results of the test procedures applied to these trapdoors, and to 0 if not.

If the test module 5C detects the presence of a match between at least one of the intercepted encrypted character strings and at least one trapdoor of a keyword provided by the security device RG 6 (when detection rules RUL are specified, this means that a match is detected by the test module 5C between intercepted encrypted character strings and a detection rule defined on the basis of keyword trapdoors, this corresponding to the case where the regular expression defined by this detection rule is equal to 1) (response yes in test step E120), then the test module 5C notifies the detection module 5D of this match (step E130): the existence of such a match and notification thereof to the module 5D constitute a step of detecting an intrusion on the network within the meaning of the invention.

Where applicable, various actions may be taken by the intrusion detection device MB 5 depending on its configuration. For example, it may notify the administrator of the network NW of this detection via its module 5D and its communication means 11. As a variant or in addition, the intrusion detection device MB 5 may delete the suspect data packet, in other words the tokens TOK associated with this packet, and not transmit them to the receiver device RX 3, as these are corrupted, etc.

In the embodiment described here, if it turns out that no character string TOK corresponds to a cipher of a keyword after successive application of the test procedure TEST to all of the encrypted character strings, to all of the trapdoors TRAP provided by the security device RG 6 and to all of the detection rules RUL (response "no" in test step E120), then this means that no intrusion has been detected by the intrusion detection device MB 5 on the intercepted encrypted character strings TOK between the sender device TX 2 and the receiver device RX 3. In the embodiment described here, in such a scenario, the intrusion detection device MB 5, via its reconstruction module 5E, then reconstructs an encrypted version v-ENC(M) of the message M from the plurality of intercepted encrypted character strings TOK (step E140). This reconstruction is easily able to be performed by keeping only the encrypted character strings corresponding to separate and successive characters of the message M, and by concatenating these character strings. For example v-ENC(M)=w1(k), wk+1(k), wk+2(k), etc.

As a variant, another reconstruction algorithm may be used by the reconstruction module 5E to determine an encrypted version of the message M. This algorithm may in particular take into account the available redundancy, where applicable, in the plurality of encrypted character strings TOK intercepted by the intrusion detection device MB 5 by virtue of the division applied by the sender device TX 2. It is noted however that if the division that is implemented is based on delimiters, there is no redundancy between the tokens.

The intrusion detection device MB 5 then transmits the encrypted version v-ENC(M) of the message M thus recovered to the receiver device RX 3 via its transmission module 5F and its communication means on the network NW (step E150).

Upon reception of the encrypted version v-ENC(M) of the message M, the receiver device RX 3, by way of its decryption module 3B, decrypts the encrypted version v-ENC(M) (step E160). To this end, it uses the decryption procedure DEC of the searchable encryption algorithm ALG-DSE and its private decryption key sk(RX), in a manner known per se.

The invention therefore makes it possible, by virtue of using the searchable decryption algorithm ALG-DSE, to apply a deep inspection procedure to the encrypted traffic exchanged between the sender device TX 2 and the receiver device RX 3 without the intrusion detection device MB 5 knowing the keywords defined by the security device RG 6. It is noted that, in the embodiment described here, the searchable encryption algorithm ALG-DSE has been considered to be the algorithm proposed by Fuhr and Paillier in the abovementioned article. This algorithm has the particular feature and the advantage of making it possible to generate a trapdoor bypass key that is independent of the secret decryption key of the receiver device. However, this scenario is not limiting per se, and other searchable encryption algorithms may be contemplated for implementing the invention, including in particular algorithms for which such independence is not provided, such as for example in the article by D. Boneh and G. Di Crescenzo entitled "Public Key Encryption with keyword search", Advances in Cryptology, EUROCRYPT 2004, volume 3027 in the series *Lecture Notes in Computer Science*, pages 506-522.

Moreover, in the embodiment described here, the invention makes it possible to deal with the case in which the sender device TX 2 and the receiver device RX 3 may both be dishonest to a certain degree. Specifically, the encrypted version of the message M that the receiver device RX 3 decrypts is the version tested and reconstructed by the intrusion detection device MB 5. Thus, a sender device TX 2 of which control may have been taken by an attacker, and which may therefore have become dishonest, could transmit sensitive data or viruses under the control of the attacker. In this case, such transmission would be detected by the intrusion detection device MB 5. Specifically, the latter tests and reconstructs the encrypted version of the message M. It is therefore able to detect the sending of sensitive data or viruses in this test.

However, it is noted that, as a variant, it is possible to contemplate a less secure embodiment in which the sender device TX 2, in addition to the encrypted character strings TOK, sends an encrypted version of the message M to the receiver device RX 3, and that, in the absence of intrusion detection by the device MB 5, it is this encrypted version of the message M that is transmitted to the receiver device RX 3 and decrypted thereby. However, it is readily understood that, in this embodiment, a dishonest sender device TX 2 could send encrypted character strings that do not contain malware, while at the same time introducing malware only into the encrypted version of the message M. Such a situation would unfortunately not be able to be detected by the intrusion detection device MB 5.

The invention claimed is:

1. A method for detecting intrusions on a network via which a sender device and a receiver device communicate, the method using a searchable encryption algorithm defined by a key generation algorithm, an encryption/decryption procedure, a trapdoor generation algorithm for generating trapdoors, and a test procedure configured to use said trapdoors, the method comprising:
   generating, using said key generation algorithm, a trapdoor bypass key for a security device configured to determine a plurality of keywords characteristic of intrusions liable to affect the network;
   generating, by the security device, a trapdoor for each keyword of said plurality of keywords using said trapdoor generation algorithm parameterized by the trapdoor bypass key, the trapdoor generated for said each keyword making it possible to detect a character string representative of a cipher of said each keyword obtained by using said encryption/decryption procedure;
   providing, by the security device, the trapdoors generated for said plurality of keywords to an intrusion detection device located in the network between the sender device and the receiver device;
   intercepting, by the intrusion detection device, a plurality of encrypted character strings sent on the network by the sender device to the receiver device, said plurality of encrypted character strings resulting from the encryption of a plurality of character strings resulting from the sender device dividing a message intended for the receiver device, said encryption being performed by using said encryption/decryption procedure and of a public encryption key associated with the receiver device;
   applying, by the intrusion detection device, the test procedure to the plurality of intercepted encrypted character strings, said test procedure using the trapdoors provided by the security device in order to detect whether at least one encrypted character string from among said plurality of intercepted encrypted character strings is representative of at least one cipher of a keyword from among said plurality of keywords; and
   detecting an intrusion on the network if the intrusion detection device detects the existence of such an intercepted encrypted character string.

2. The method of claim 1, wherein the trapdoor bypass key is independent of a private decryption key of the receiver device associated with the public encryption key of said receiver device.

3. The method of claim 2, wherein said trapdoor bypass key is generated by the security device.

4. The method of claim 1, further comprising, after applying the test procedure, if no intrusion is detected by the intrusion detection device:
   reconstructing, by the intrusion detection device, an encrypted version of the message from the plurality of intercepted encrypted character strings; and
   transmitting, by the intrusion detection device, this encrypted version of the message to the receiver device.

5. The method of claim 1, wherein, in the providing the trapdoors to the intrusion detection device, the security device further provides the intrusion detection device with detection rules to be applied in applying the test procedure.

6. The method of claim 1, wherein the keywords determined by the security device are kept secret from the intrusion detection device by the security device.

7. The method of claim 1, further comprising:
   dividing, by the sender device, the message intended for the receiver device into the plurality of character strings;
   encrypting, by the sender device, the plurality of character strings by using said encryption/decryption procedure and the public encryption key associated with the receiver device;
   sending, by the sender device, said plurality of encrypted character strings to the receiver device, said plurality of encrypted character strings being intercepted by the intrusion detection device;
   and
   decrypting, by the receiver device, an encrypted version of the message by using said encryption/decryption procedure.

8. The method as claimed in claim 7, wherein a size of the character strings resulting from the message being divided is set depending on a size of the keywords determined by the security device.

9. A method for monitoring a network by an intrusion detection device by using a searchable encryption algorithm defined by a key generation algorithm, an encryption/decryption procedure, a trapdoor generation algorithm for generating trapdoors, and a test procedure configured to use said trapdoors, said intrusion detection device being located on the network between a sender device and a receiver device, said method for monitoring comprising:
   obtaining, from a security device, a plurality of trapdoors generated by the security device for a plurality of keywords characteristic of intrusions liable to affect the network, the plurality of keywords generated by using said trapdoor generation algorithm parameterized by a trapdoor bypass key generated for the security device by using said key generation algorithm, said keywords being kept secret from the intrusion detection device by the security device;
   intercepting a plurality of encrypted character strings sent on the network by the sender device to the receiver device, said plurality of encrypted character strings resulting from the encryption of a plurality of character strings resulting from the sender device dividing a message intended for the receiver device, said encryption being performed by using said encryption/decryption procedure and of a public encryption key associated with the receiver device;
   applying the test procedure to the plurality of intercepted encrypted character strings, said test procedure using the trapdoors provided by the security device to detect whether at least one encrypted character string from among said plurality of intercepted encrypted character strings is representative of at least one cipher of a keyword from among said plurality of keywords; and detecting an intrusion on the network if the intrusion detection device detects the existence of such an intercepted encrypted character string.

10. An intrusion detection device for detecting intrusions on a network by using a searchable encryption algorithm defined by a key generation algorithm, an encryption/decryption procedure, a trapdoor generation algorithm for generating trapdoors, and a test procedure configured to use said trapdoors, said intrusion detection device being intended to be located on the network between a sender device and a receiver device and comprising:

a processor; and a non-transitory computer-readable medium comprising instructions stored thereon, which when executed by the processor configure the intrusion detection device to:

obtain, from a security device, a plurality of trapdoors generated by the security device for a plurality of keywords characteristic of intrusions liable to affect the network, the plurality of keywords generated by using said trapdoor generation algorithm parameterized by a trapdoor bypass key generated for the security device by using said key generation algorithm, said keywords not being known to the intrusion detection device;

intercept a plurality of encrypted character strings sent on the network by the sender device to the receiver device, said plurality of encrypted character strings resulting from the encryption of a plurality of character strings resulting from the sender device dividing a message intended for the receiver device, said encryption being performed by using said encryption/decryption procedure and of a public encryption key associated with the receiver device;

apply said test procedure to the plurality of intercepted encrypted character strings, the test procedure using the trapdoors obtained from the security device in order to detect whether at least one encrypted character string from among said plurality of intercepted encrypted character strings is representative of at least one cipher of a keyword from among said plurality of keywords; and detect an intrusion affecting the network if the test procedure detects the existence of such an intercepted encrypted character string.

11. The intrusion detection device as claimed in claim 10, wherein the instructions further configure the intrusion detection device to, when no intrusion has been detected on the network, reconstruct an encrypted version of the message from the plurality of intercepted encrypted character strings, and transmit this encrypted version of the message to the receiver device.

12. A system for detecting intrusions on a network via which a sender device and a receiver device are configured to communicate, the system being configured to use a searchable encryption algorithm defined by a key generation algorithm, an encryption/decryption procedure, a trapdoor generation algorithm for generating trapdoors, and a test procedure configured to use said trapdoors, the system comprising:

a security device, configured to determine a plurality of keywords characteristic of intrusions liable to affect the network;

an intrusion detection device located in the network between the sender device and the receiver device, the intrusion detection device comprising:

a first processor; and a first non-transitory computer-readable medium comprising instructions stored thereon, which when executed by the first processor configure the intrusion detection device to:

obtain, from the security device, a plurality of trapdoors generated by the security device for a plurality of keywords characteristic of intrusions liable to affect the network, the plurality of keywords generated by using said trapdoor generation algorithm parameterized by a trapdoor bypass key generated for the security device by using said key generation algorithm, said keywords not being known to the intrusion detection device;

intercept a plurality of encrypted character strings sent on the network by the sender device to the receiver device, said plurality of encrypted character strings resulting from the encryption of a plurality of character strings resulting from the sender device dividing a message intended for the receiver device, said encryption being performed by using said encryption/decryption procedure and of a public encryption key associated with the receiver device;

apply said test procedure to the plurality of intercepted encrypted character strings, the test procedure using the trapdoors obtained from the security device in order to detect whether at least one encrypted character string from among said plurality of intercepted encrypted character strings is representative of at least one cipher of a keyword from among said plurality of keywords; and detect an intrusion affecting the network if the test procedure detects the existence of such an intercepted encrypted character string; and at least one key generation module configured to generate the trapdoor bypass key intended for the security device by using the key generation algorithm;

and wherein the security device comprises:

a second processor; and a second non-transitory computer-readable medium comprising instructions stored thereon, which when executed by the second processor configure the security detection device to:

generate the trapdoor for each keyword of said plurality of keywords by using said trapdoor generation algorithm parameterized by the trapdoor bypass key, the trapdoor generated for said each keyword making it possible to detect a character string representative of the at least one cipher of said each keyword obtained by using the encryption/decryption procedure; and provide the trapdoors generated for the keywords to the intrusion detection device.

13. The system as claimed in claim 12, further comprising:

the sender device and the receiver device, said receiver device having a key pair comprising a public encryption key and a private decryption key; and wherein:

the sender device is configured to:

divide the message intended for the receiver device into the plurality of character strings;

encrypt the plurality of character strings by using said encryption/decryption procedure and of the public encryption key associated with the receiver device; and send said plurality of encrypted character strings to the receiver device, said plurality of encrypted character strings being intercepted by the intrusion detection device; and the receiver device is configured to decrypt an encrypted version of the message by using said encryption/decryption procedure.

\* \* \* \* \*